United States Patent [19]
Vuichard

[11] Patent Number: 4,742,205
[45] Date of Patent: May 3, 1988

[54] METHOD AND DEVICE FOR POSITIONING A METALLIC PIECE ON A MACHINE-TOOL, AND USE OF THE METHOD

[75] Inventor: Michel Vuichard, Vallery, France

[73] Assignee: Charmilles Technologies S.A., Geneva, Switzerland

[21] Appl. No.: 881,892

[22] Filed: Jul. 3, 1986

[30] Foreign Application Priority Data

Jul. 4, 1985 [CH] Switzerland ............... 2896/85

[51] Int. Cl.⁴ ............... B23H 1/00; B23H 7/26
[52] U.S. Cl. ............... 219/69 M; 219/69 R; 219/69 W
[58] Field of Search ............... 219/69 W, 69 M, 69 R, 219/69 E, 68; 204/206, 224 M, 129.1, 129.5, 129.7

[56] References Cited

U.S. PATENT DOCUMENTS

| | | | |
|---|---|---|---|
| 4,484,052 | 11/1984 | Inoue | 219/69 M |
| 4,547,646 | 10/1985 | Briffod | 219/69 W |
| 4,628,172 | 12/1986 | Inoue | 219/69 W |
| 4,675,492 | 6/1987 | Yokomichi et al. | 219/69 W |

FOREIGN PATENT DOCUMENTS

| | | | |
|---|---|---|---|
| 60-67027 | 4/1985 | Japan | 219/69 M |
| 60-67028 | 4/1985 | Japan | 219/69 W |
| 60-67029 | 4/1985 | Japan | 219/69 W |

*Primary Examiner*—A. D. Pellinen
*Assistant Examiner*—Geoffrey S. Evans
*Attorney, Agent, or Firm*—Gifford, Groh, VanOphem, Sheridan, Sprinkle and Dolgorukov

[57] ABSTRACT

A method and apparatus for holding an electrically conductive workpiece in a machine tool by forming at least one positioning cavity or recess on a face of the workpiece by a holder having a tip used for machining the cavity or recess by a conventional EDM sinking operation. Subsequently to forming the cavity, the tip is used as one of the holding members for the workpiece. Two tips may be used to sink cavities or recesses on opposite surfaces of the workpiece, or the tips may take the form of fingers sunk into the workpiece from one side only. The tips form part of support members mounted on the end of displaceable arms for enabling the workpiece to be positioned relative to a tool or to be displaced. The tip-provided supports may be used for supporting a portion of the workpiece being cut off or severed from the workpiece.

23 Claims, 3 Drawing Sheets

METHOD AND DEVICE FOR POSITIONING A METALLIC PIECE ON A MACHINE-TOOL, AND USE OF THE METHOD

BACKGROUND OF THE INVENTION

Full automation of a machine-tool, such as an EDM machining center, requires that the workpiece or the electrode which acts as a machining tool be securely maintained and carried by means of mobile supports ensuring a rigid connection between the workpiece and its support. This connection must also maintain exactly in position the portion of a workpiece which has been cut away by the electrode wire of a travelling wire EDM apparatus. This is necessary firstly in order to avoid that the cut-off portion produces internal stresses in the workpiece just before it is fully cut away, and secondly in order to avoid that the offcut falls down at the end of the cutting operation. Furthermore, the mobile support must perform the function of discarding the portion cut-off from the workpiece and transport the workpiece when the machining mode is changed, for instance, from a travelling wire cutting operation to machining by means of a massive electrode tool. Another important function which is desirable holding the workpiece from one side only, especially in order to transport it.

The invention aims at fulfilling those requirements.

SUMMARY OF THE INVENTION

It is a principal object of the invention to provide a method and apparatus capable of performing the above mentioned functions through the use of a single fastening system that works with greater accuracy and reliability than those known in the art.

It is a further object of the invention to provide a method and apparatus for positioning a metallic workpiece on a machine-tool on which it is to be machined, which is simple in application, reliable and easily implemented.

Although the invention has applications for mounting a workpiece, as long as it is electrically conductive, on any machine-tool, it is particularly advantageous when applied to an EDM machining center which combines in a single unit both a travelling wire EDM apparatus and a die or cavity sinking electrode tool EDM apparatus. In such applications to an EDM machining center, the invention provides a first support holding the workpiece to be machined, while a second support holds an electrode tool which is to be sunk into the workpiece. Each support is constructed so that it can carry a piece between the machining position and a transit position where it is seized by a robot which transfers it to a store. The reverse travel from the store to the machining position can be performed by the same elements. In order to obtain more possibilities for machining, the supports may comprise a device for rotation around two mutually perpendicular axes, or also a system combining translational and rotational movements.

The invention will be better understood with the aid of the following detailed descripiton thereof, which makes reference to the annexed drawing wherein like reference numerals refer to like or equivalent pars, and in which:

DETAILED DESCRIPTION OF THE PREFERRED EMBODIMENTS

Figure 1:
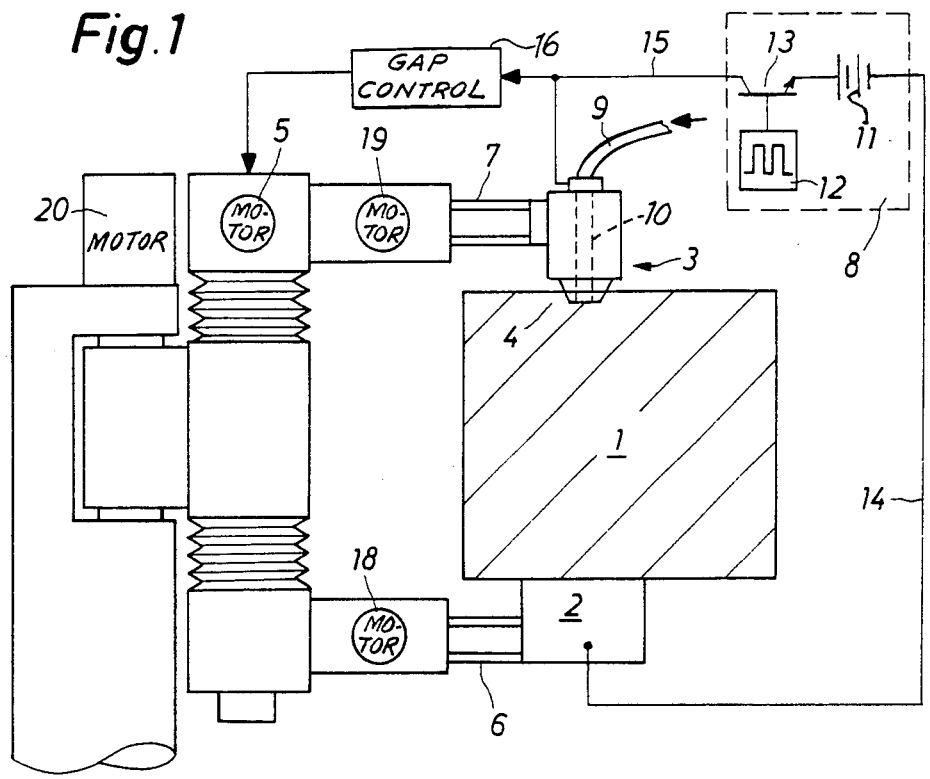
FIG. 1 is a schematic view of an example of embodiment of the invention.

Referring to FIG. 1, there is illustrated schematically a pariculary simple structure, in which the workpiece 1 to be machined is held between two supports 2 and 3. The support 3 comprises a tip 4 which is arranged so that it can be used as an EDM sinking electrode tool for providing a recess in the upper surface of the workpiece.

The support 2 is mounted on the end of an arm 6 and the support 3 is mounted on the end of an arm 7. The arm 7 is displaceable relative to the arm 6 by a servomotor 5, for enabling the tip 4 of the support 3 o be sunk to a predetermined depth into the workpiece 1, by a conventional EDM sinking process. For that purpose, the support 3, which is made of electrically conductive material, and the workpiece 1, which is metallic and electrically conductive, are connected across an EDM pulse generator 8, via a line 14 connecting a terminal of the pulse generator 8 to the support 2, also made of electrically conductive material, which is in contact with the workpiece 1 and via a line 15 connecting the other terminal of the pulse generator 8 to the support 3. The pulse generator 8, as is well known in the art, comprises a DC power source 11 in series with a switch 13 taking the form of, for example, a transistor or battery of transistors in parallel. A frequency generator, or monostable multivibrator, 12 biases the base of the transistor switch 13 sequentially to conductance and nonconductance. Such a circuit arrangement is well known in the EDM art.

A control circuit 16 regulates for example, the width of the gap between the working tip 4 of the support 3 acting as an EDM electrode tool, during sinking of the tip 4 into the workpiece 1, as is also well known in the EDM art, by controlling the servomotor 5 that causes advance of the tip 4 of the support 3 into the workpiece. Machining fluid is supplied to the machining zone by a conduit 9 and a passageway 10 through the support 3 and tip 4.

Figure 2:
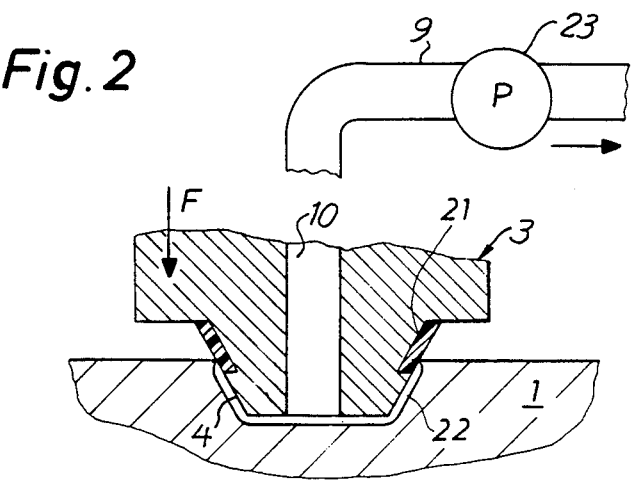
FIG. 2 is an enlarged portion of FIG. 1.

As shown in further detail at FIG. 2, the tip 4 on the end of the support 3 is frusto-conical in shape, with a diameter progressively decreasing towards the end face of the tip 4. Surrounding the base of the tip 4 there is a frusto-conical ring 21 made of dielectric material. As the tip 4 is sunk into the workpiece 1, a cavity or recess 22 is formed by electrical discharges across the machining zone between the active surfaces of the tip 4 and the surfaces being machined in the workpiece. the surfaces being mahined in the workpiece 1 correspond to the frontal face of the tip 4 and to the peripheral surface of the tip 4, until the insulating ring 21 engages the edge of the cavity or recess 22 being formed in the workpiece 1. Machining by electrical discharges is continued until the material removal rate becomes negligible or, in other words, until the gap between the active surfaces of the tip 4 and the surface of the cavity or recess 22 being formed in the workpiece 1 reaches a width reducing the material removal rate to practically nothing, at a given pulse voltage. The pressure in the direction of the arrow F exerted by the insulating ring 21 against the edge of the cavity 22 may be further increased by the servomotor 5, FIG. 1, or by a spring, not shown, urging the upper support 3 towards the lower support 2.

Another arrangement is illustrated at FIG. 2 for clamping the workpiece 1 solidly against the tip 4 of the support 3. A pump 23 in the conduit 9 which, during the sinking of the tip 4 into the workpiece 1 provides machining fluid to the gap, is reversed such as to reverse the flow of machining fluid and exert a suction through the passageway 10 in the space between the portion of the tip 4 beyond the dielectric ring 21 and the surface of the cavity or recess 22 in the workpiece 1, which strongly urges the edge of the cavity or recess 22 in engagement with the surface of the dielectric ring 21.

When a sufficiently deep recess 22 has been machined in the surface of the workpiece 1 by using the tip of the support 3 as an EDM electrode tool, and electrical discharge machining has reached a negligible rate of material removal, the pulse generator 8 is shut off and the supports 2 and 3 are moved slightly closer together, if necessary, so that they both press against the workpiece 1 and clamp it tight, FIG. 1. The position of the workpiece 1 with respect to the supports 2 and 3, is then defined with great precision and reliability. Thus, when the workpiece 1 is subsequently machined by means of other DEM electrode tools, for example, not shown on the drawing the simultaneous displacement of both supports provides accurate control of the position of the workpiece, which is displaced with practically the same accuracy as the supports 2 and 3. The synchronous motion of the supports 2 and 3 can, for instance, be obtained through the action of sychronized translation servomotors 18 and 19, which extend and retract the arms 6 and 7, respectively, or through the action of a servomotor 20 which effectuates the simultaneous pivoting of both arms. It is therefore possible to perform very high precision machining of the workpiece 1. The interlocking between the two supports 2 and 3 and the workpiece 1 can be further improved by providing the lower support 2 with a tip, not shown, similar to that of the upper support 3. The second tip is used to sink in the lower surface of the workpiece 1 a second recess in which the lower support tip fits.

In addition, if it is desired to position the workpiece not only with great accuracy but also repeatedly after disengagement of the workpiece from its supports, which is sometimes necessary in the course of complicated machining operations, it is sufficient to provide at least one support tip with a non-circular cross-section so that the workpiece can take only a limited number of angular positions with respect to that tip, once it is engged by the tip. Obviously, the same result could be obtained through the use of two tips, together with corresponding recesses in the workpiece, either on one side or on both sides of the workpiece.

Figure 3:
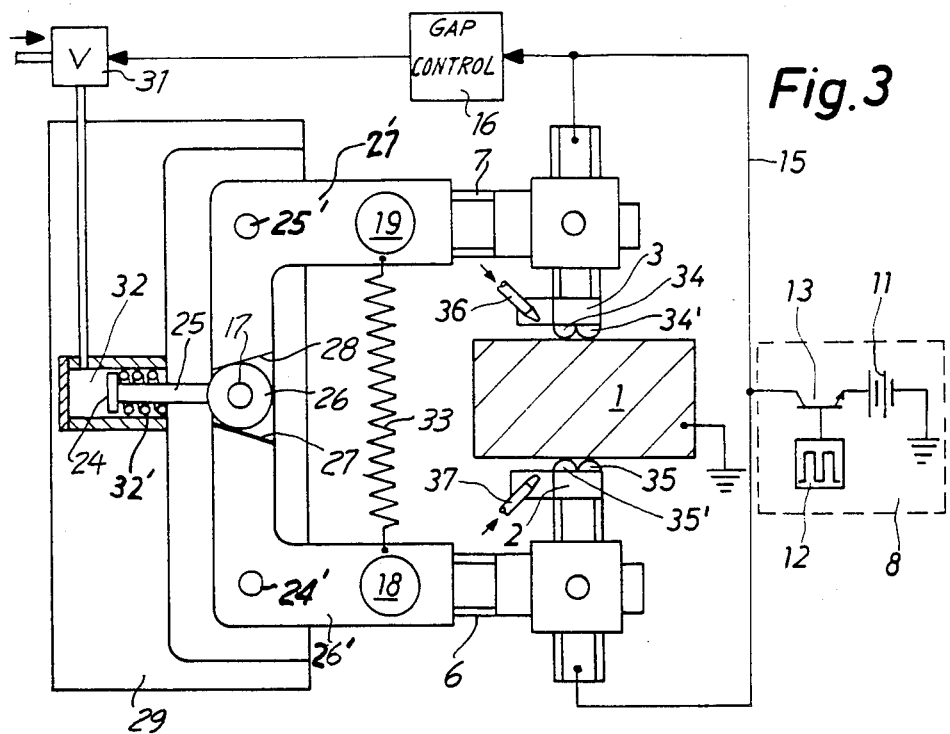
FIGS. 3 and 4 are schematic views of additional embodiments of the invention.

Referring now to FIG. 3, wherein elements which are the same or equivalent to elements shown at FIGS. 1 and 2 are identified by the same reference numerals, there is illustrated a modification of the invention comprising a pair of hemispherical tips 34, 34', and 35, 35' on the end of each of the workpiece supports 2 and 3, respectively. As the hemispherical tips are not provided with a passageway for supplying machining fluid to the machining zone, the machining fluid is introduced into the machining zone by way of nozzles 36 and 37. The relative displacement of the supports 2 and 3 is effected by a single hydraulic servomotor 31 which is controlled by the control circuit 16 and actuates a hydraulic jack 32. In the structure illustrated, the two suppors 2 and 3 are respectively mounted on two jaws 26' and 27' of a clamp 29. These jaws are pivotable about pivot pins 24' and 25'. Pivoting of the clamp jaws 26' and 27' is operated by the hydraulic jack 32, against the action of a return spring 33. The force exerted by the return spring 33 upon the jack 32 is applied upon a link 17 between the jaws 26' and 27' in a direction that causes piece 1 to be clamped between said jaws, that is, the supports 2 and 3. Opening of the clamp 29, that is, urging apart each other of the jaws 26' and 27' and consequently of the supports 2 and 3. Opening of the clamp 29, that is, urging apart each other of the jaws 26' and 27' and consequently of the supports 2 and 3, is controlled by the servomotor 31.

More particularly, the link 17 first comprises a rod 25 connected at one end to a piston 24 contained in the jack 32. The link 17 also comprises a roller or cam follower 26 carried by the rod 25 opposite the piston 24. The cam follower 26 is disposed between two oppositely inclined ram surfaces 27 and 28 formed on the ends of the L-shaped clamp jaws 26' and 27', respectively opposite the support arms 6 and 7 carried thereon. The piston 24 is normally urged to the left, as shown in the drawing, by a spring 32' contained in the jack 32, disposed about the enclosed portion of the rod 25. While two hemispherical cavities are formed in the top surface of the workpiece 1 by the hemispherical tips 34 and 34' and two hemispherical cavities are formed in the bottom surface of the workpiece by the hemispherical tips 35 and 35',the workpiece 1 is preferably supported by some auxiliary support means, not shown, such that a gap may be maintained between the active face of the tips and the surface of the workpiece 1. The control circuit 16, which controls the servomotor 31 which, in the structure of FIG. 3 may take the form of a variable flow valve, is arranged such as to control the gap conditions as a function of the parameter values occurring in the narrower one of the two gaps.

Tips having other shapes than hemispherical shapes can be used, such as to provide non-circular sections of the recesses or cavities formed in the workpiece, such as tips having an oval, a square, or a triangular section, or tips provided with peripheral notches, radial extending projections, grooves,and the like.

Figure 4:
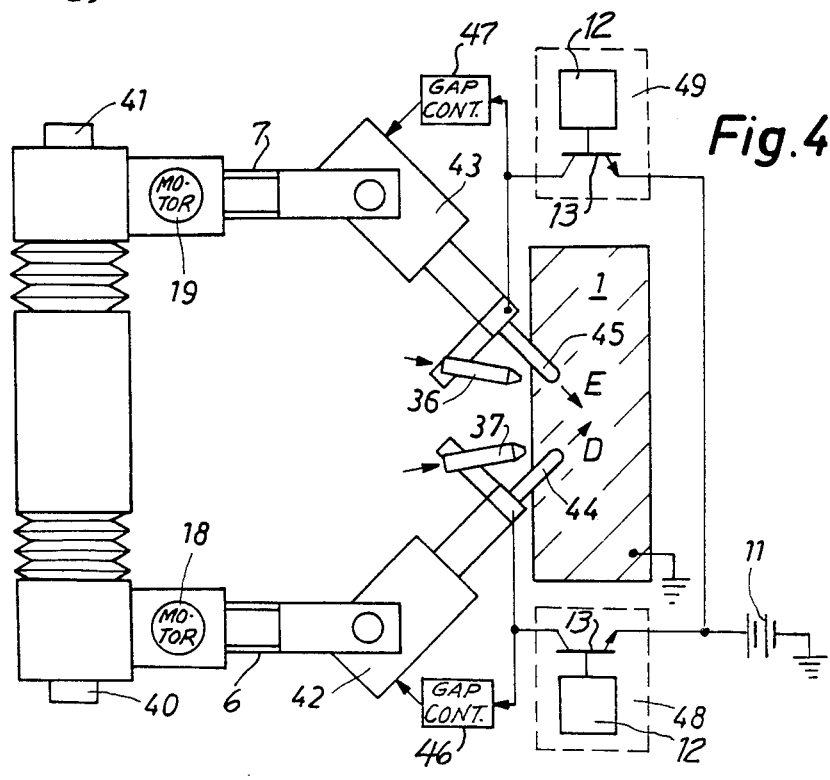

FIG. 4 illustrates a further modification of the invention wherein the workpiece 1, rather than being clamped between two opposite supports, is supported by a pair of support members disposed on one side only of the workpiece. In the structure illustrated at FIG. 4, the workpiece supports 42 and 43 have tips each shaped as a finger, as shown at 44 and 45, which becomes inserted in the workpiece in two converging directions E and D, such that the finger-like tips 44 and 45 hold the workpiece from one side of the workpiece only. Machining fluid is provided by a pair of external nozzles 36 and 37. Because each of the finger-like tips 44 and 45 is disposed at an angle, each tip has its own electrical discharge producing circuitry and advance mechanism. Namely, the lower tip 44, which is mounted on the end of the angularly positionable support 42 installed on the end of the arm 6, is supplied in electrical discharge triggering voltage pulses by a separate pulse generator 48, and the advance of the tip 44 into the workpiece 1 is controlled by an appropriate control circuit 46 in turn controlling a servomotor, not shown, providing motion to the tip 44 relative to the support member 42. The upper tip 45, which is mounted on the end of the angularly positionable support 43 installed on the end of the arm 7, is connected to a separate pulse generator 49 and has its own advance, or gap regulating, circuit 47. For the purpose of achieving a greater flexibility in use, the angular motion of the arms 6 and 7 on the end of which are mounted the angularly positionable tip support members 42 and 43, are obtaned through separate servomotors 40 and 41, respectively. Other arrangements than the one specifically illustrated will be immediately apparent to those skilled in the art, as, for example, a structure comprising a pair of diverging tips, or three converging or diverging tips, one at each apex of an imaginary triangle.

Figure 5:
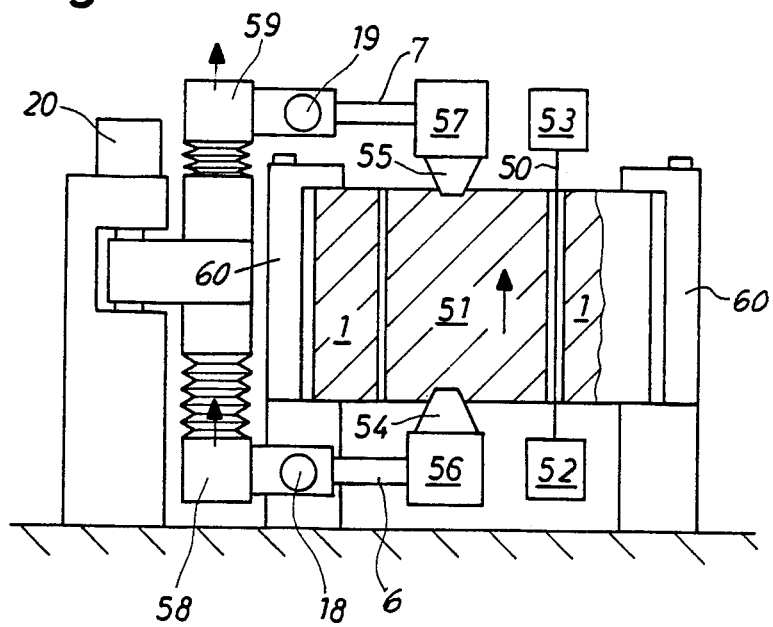
FIG. 5 schematically illustrates an arrangement for holding and manipulating an offcut that was severed from a workpiece during machining.

FIG. 5 illustrates an embodiment of the invention for supporting a central portion 51 cut-away, by the electrode wire of a travelling wire EDM apparatus, from the workpiece or blank 1 which is supported proximate its edges by conventional clamping means 60. The cut in the workpiece or blank 1 is effected by means of a travelling wire electrode 50 stretched between a lower support and guide member 52 and an upper support and guide member 53. The offcut 51, or portion 51 cut away from the workpiece 1, is held between the tips 54 and 55 on the end of the supports 56 and 57, respectively. A pair of servomotors 18 and 19 are adapted to extend and retract the arms 6 and 7 at the end of which are mounted the suppors 56 and 57, respectively, and another pair of servomotors 58 and 59 are adapted to displace the arms 6 and 7 verically. The operation of the servomotors in a pair may be synchronized if so desired. A servomotor 20 can pivot the arms simultaneously. An appropriate control circuit, not shown, controls all the servomotors so as to displace the workpiece in such manner that the arms 6 and 7 do not interfere with the motion that must be performed by the wire guide and supprt members 52 and 53 when cutting the workpiece 1 away from the offcut 51. Once the offcut 51 is completed, both arms 6 and 7 may be moved upwardly by way of the synchronized action of the servomotors 58 and 59, such as to enable a robot hand or other gripping device to grip the offcut 51 and remove it from the machining area.

Having thus described the present invention by way of examples of method and apparatus for practicing the invention, modifications whereof will be apparent to those skilled in the art, what is claimed as new is as follows:

1. A method for holding and positioning an electrically conductive workpiece on a machine tool, said workpiece being a separate piece to be machined, an offcut portion to be separated from a blank, or a sinking tool to be shaped, said method comprising sinking by electrical discharge machining at least one recess in at least one face of the workpiece by means of an electrode tool having a tip, and holding the workpiece by engaging said tip in the recess.

2. The method of claim 1 wherein a pair of recesses are sunk in opposite faces of the workpiece each by one of a pair of electrode tools each having a tip, whereby the workpiece is held and positioned by engagement of the tip of each of said electrode tools in each of said recesses.

3. The method of claim 1 wherein at least two recesses are formed in the workpiece in a single face of the workpiece, said recesses being formed by at least two electrode tools along different axes, each of said electrode tools having said tip, whereby the workpiece is held and positioned by engagement of the tip of each of said electrode tools in each of said recesses.

4. The method of claim 1 wherin the tip of said electrode tool is tapered and has an end face of a narrower width, said tip having a peripheral dielectric portion a distance from its end face, and further comprising discontinuing sinking said tip into said recess when said dielectric portion engages the edge of said recess.

5. The method of claim 4 wherein machining fluid under pressure is supplied into the gap formed between the surface of the tip and the surface of the recess in the workpiece during sinking of the recess by electrical discharge machining, and further comprising reducing the machining fluid pressure in said gap to a pressure less than atmospheric pressure for improving the holding power of the tip on the workpiece.

6. The method of claim 1 wherein the recess is formed in a portion of the workpiece intended to be severed from the workpiece.

7. The method of claim 2 wherein the recesses are formed in a portion of the workpiece intended to be severed from the workpiece.

8. The method of claim 3 wherein the recesses are formed in a portion of the workpiece intended to be severed from the workpiece.

9. The method of claim 4 wherein the recess is formed in a portion of the workpiece intended to be severed from the workpiece.

10. The method of claim 5 wherein the recess is formed in a portion of the workpiece intended to be severed from he workpiece.

11. The method of claim 1, wherein said machining and holding steps are carried out employing a tip having a nonhemispherial shape, and wherein said recess has a corresponding cross-sectional shape, whereby angular displacement of said workpiece with respect to said tip is limited when said tip engages said recess.

12. The method of claim 11, wherein said tip possesses a cross section which is one of: an oval, a square, a triangle, notched, grooved, and inclusive of radially extending projections.

13. The method of claim 1, wherein said machining and holding steps are carried out employing a tip having a hemispherical shape, and wherein said recess has a corresponding cross-sectional shape, whereby angular displacement of said workpiece with respect to said tip is limited when said tip engages said recess.

14. The method of claim 1, wherein at least two recesses are formed in the workpiece in two different adjacent or opposite faces thereof, said recesses being formed by at least two electrode tools along different axes, each of said electrode tools having said tip, whereby the workpiece is held and positioned by engagement of the tip of each of said electrode tools in each of said recesses.

15. The method of claim 1 comprising: performing said linking step by electrical discharge machining until the rate of material removal by such machining is negligible; terminating said machining step; and moving said tip in said recess towards said workpiece sufficiently so that said tip presses against said workpiece, thereby engaging said tip in said recess and holding said workpiece.

16. An apparatus for holding and positioning an electrically conductive workpiece on a machine tool, said apparatus comprising a movable support member, an electrode tool mounted on said support member, said electrode tool having a tip, an EDM pulse generator connected across the workpiece and the tip of the electrode tool for sinking a recess in at least one surface of the workpiece, and means for clamping the electrode tool tip in the recess in the workpiece after shutting off said pulse generator.

17. The apparatus of claim 16 wherein two electrode tools are provided, each having at least one tip, and further comprising means for simultaneously displacing said electrode tools in opposite directions.

18. The apparatus of claim 16 wherein two electrode tools are provided displaceable along converging axes, each of said electrode tools having a tip, and means for displacing said electrode tools.

19. The apparatus of claim 16 wherein said electrode tool tip is tapered, and further comprising a dielectric ring peripherally disposed on said tip a distance away from the end face of the tip.

20. The apparatus of claim 19 further comprisng a passageway through said electrode tool and tip for supplying machining fluid to a gap formed between said tip and the surface of the recess sunk in the workpiece during electrical discharge machining of said recess, and pumping means for reducing the pressure in said gap below ambient pressure for improving the holding characteristic of said tip on the workpiece.

21. The apparatus of claim 16, wherein said tip has a nonhemispherical shape and said recess has a corresponding cross-sectional shape.

22. the apparatus of claim 21, wherein said tip possesses a cross section which is one of: an oval, a square, a triangle, notched, grooved, and inclusive of radially extening projections.

23. The apparatus of claim 16, wherein said tip has a hemispherical shape, and said recess has a corresponding cross-sectional shape.

* * * * *